US010447682B1

(12) United States Patent
Du Lac (10) Patent No.: US 10,447,682 B1
(45) Date of Patent: Oct. 15, 2019

(54) TRUST MANAGEMENT IN AN ELECTRONIC ENVIRONMENT

(71) Applicant: Amazon Technologies, Inc., Reno, NV (US)

(72) Inventor: Joshua Stephen Du Lac, Little Elm, TX (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 89 days.

(21) Appl. No.: 15/272,258

(22) Filed: Sep. 21, 2016

(51) Int. Cl.
*H04L 29/06* (2006.01)
*G06F 9/455* (2018.01)

(52) U.S. Cl.
CPC ...... *H04L 63/0823* (2013.01); *G06F 9/45533* (2013.01); *H04L 63/0838* (2013.01)

(58) Field of Classification Search
CPC ............. H04L 63/0823; H04L 63/0838; G06F 9/45533
USPC ....................................................... 726/2–10
See application file for complete search history.

(56) References Cited

U.S. PATENT DOCUMENTS

| 9,819,496 | B2* | 11/2017 | Lin | H04L 29/06 |
|---|---|---|---|---|
| 9,930,029 | B2* | 3/2018 | Ramachandran | G06F 9/45545 |
| 2015/0067828 | A1* | 3/2015 | Alvarez | H04L 63/062 |
| | | | | 726/19 |
| 2015/0089497 | A1* | 3/2015 | Borzycki | G06F 21/53 |
| | | | | 718/1 |
| 2015/0215308 | A1* | 7/2015 | Manolov | H04L 63/0823 |
| | | | | 709/229 |
| 2015/0293776 | A1* | 10/2015 | Persson | G06F 9/45558 |
| | | | | 718/1 |
| 2015/0309829 | A1* | 10/2015 | Hiltgen | G06F 9/45545 |
| | | | | 718/1 |
| 2016/0170792 | A1* | 6/2016 | Kato | G06F 9/45558 |
| | | | | 718/1 |
| 2017/0185344 | A1* | 6/2017 | Kirshenbaum | G06F 12/1458 |
| 2017/0222981 | A1* | 8/2017 | Srivastav | H04L 63/0428 |

OTHER PUBLICATIONS

Zhang et al., "Trusted connection system based on virtual machine architecture," 2010 3rd International Conference on Computer Science and Information Technology Year: 2010 vol. 1 pp. 192-196.*
Zhao et al., "Resource Pool Oriented Trust Management for Cloud Infrastructure," 2013 International Conference on Availability, Reliability and Security Year: 2013 pp. 268-273.*

* cited by examiner

*Primary Examiner* — Roderick Tolentino
(74) *Attorney, Agent, or Firm* — Hogan Lovells US LLP (57) ABSTRACT

A new machine being initiated for a deployment can attempt to authenticate itself using a signed certificate, and a decision is made whether to trust the machine and issue the signed certificate. Since not all information may be readily available, a rationalization procedure can utilize the available information, as may be associated with a certificate signing request, determine to whether to trust the machine and issue the signed certificate. When the source of truth data subsequently becomes available, a justification process can use that data to determine whether the machine should be trusted and the decision to sign the certificate was proper. If the machine should not be trusted, the certificate can be revoked and the machine terminated.

20 Claims, 6 Drawing Sheets

TRUST MANAGEMENT IN AN ELECTRONIC ENVIRONMENT

BACKGROUND

Users are increasingly performing tasks using remote computing resources, which may be offered through a shared-resource environment. This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. In many instances one of these resources will need to obtain a security mechanism, such as a signed digital certificate, in order to meet the security requirements for the system deployment within the shared-resource environment. Because the information needed to verify the source of a request for digital certificate may not be available for a period of time, the resource must either be blindly trusted, which can present a potential security vulnerability, or must wait until the necessary information is available, which can negatively impact availability of the resources allocated to that system or to other independent systems.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of resources in an electronic environment, such as a customer deployment in a customer or shared-resource environment. In particular, various approaches provide a two-part decision process for determining whether or not to grant a security credential, such as a signed digital certificate, to a machine instance or other resource operating in a customer deployment or other such environment. A new machine being initiated in such an environment can attempt to authenticate itself in order to request privileged secrets such as credentials, certificates, or private keys. The machine in many instances can authenticate itself using a signed certificate, but a decision has to be made as to whether or not to trust the machine before providing or signing its digital certificate. A decision process in accordance with various embodiments can involve a rationalization procedure and a justification procedure.

In various implementations there will be information that is not available in real-time but only through the processing of event logs or other such data. In order to not have to delay the initialization of a virtual machine, container, machine instance, function, or other such resource (physical or virtual) in a shared resource environment, a rationalization procedure can utilize the information that is readily available to make an initial determination as to whether to grant a credential such as a signed digital certificate. A number of other factors can be used in the rationalization process, as may include information indicating whether the event is an expected event, that conforms to an expected outcome, or is an outlier based on previous events, among others. In some embodiments the rationalization procedure can determine whether the requesting machine can provide a valid nonce, HMAC-based one-time password (HOTP), Time-based one-time password (TOTP), or other such cryptographic material. These and/or other criteria can be evaluated and scored against a trust threshold, and the score must meet or exceed that threshold in at least some embodiments in order to rationalize the trust the security system places in the machine by signing a certificate signing request [CSR] or otherwise providing the requested security credentials.

Eventually, the event logs (or other source of truth) will be available for analysis. Since the rationalization decision may have been based on incomplete information, it is possible that the decision to grant a signed certificate or other security credential was improper. During a justification procedure, the event log data can be analyzed once available to determine whether the machine actually should have been trusted. If it turns out the decision was improper, the certificate or other credential can be revoked and the machine potentially terminated. As part of the justification procedure, a justification service or other such system can confirm that all information was indeed valid, and that the rationalization was indeed justified (such that the machine should be trusted).

Various other such functions can be used as well within the scope of the various embodiments as would be apparent to one of ordinary skill in the art in light of the teachings and suggestions contained herein.

Figure 1:
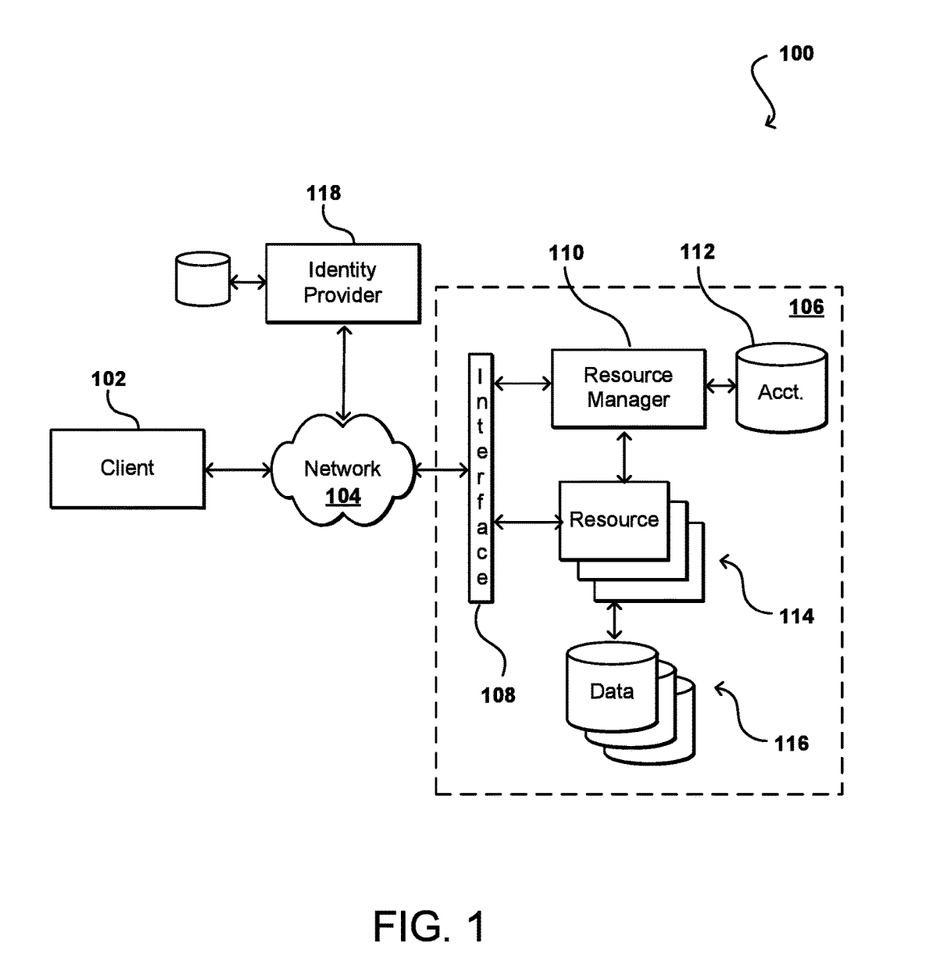
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 118, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, in many instances one or more of these electronic or digital resources, such as a physical or virtual machine, device, or container that can communicate through electronic media, must be associated with a privileged digital secret, such as a security credential, certificate, or private key, in order to operate within a customer environment, such as a customer deployment within a resource provider or other shared-resource environment. When one of these machines is added to the customer deployment, whether through auto-scaling or by request, for example, the machine should authenticate itself in order to request the appropriate privileged secret(s). One way for the machine to authenticate itself for such purposes is for the machine to present a signed digital certificate. In order to obtain a signed digital certificate, the machine can contact a system or service, such as a certificate authority or other trusted identity provider, in order to obtain a signed certificate. The storage system, database, or other customer system or service can then verify the identity of the machine, among other relevant information, and verify that authorization should be granted to that machine.

A signed certificate can be used for authentication and/or authorization during communication protocol, enabling machines to communicate with each other in a secure manner. An attacker interested in launching a machine instance in a customer deployment may attempt to request that a certificate authority sign a certificate for that new machine instance in order to indicate to other machines that the attacker's machine instance is trusted for communications. Upon receiving the signed certificate, the attacker's machine instance would also receive at least some escalated privileges within at least the customer deployment, if not the shared-resource environment as a whole. Preventing an attacker or unauthorized user from obtaining a trusted or signed certificate on a malicious or arbitrary machine can prevent the attacker from obtaining these trusted privileges or communication capabilities within the customer deployment. The mechanism for preventing these attacks should not be implemented in such a way, however, that the ability of the customer to utilize the deployment is unreasonably impacted.

Since a signature on a digital certificate is a form of trust, a determination should be made as to whether or not to trust the machine making the request and/or the request made on behalf of a machine. A machine might be manually trusted by a human user, but such trust is prone to human security issues that can be very difficult to solve. Further, manual intervention in the signing process is not conducive to the auto-scaling of resources, particularly where a customer fleet may involve thousands or millions of ephemeral machines. For large deployments such as enterprise data centers, the certificate authority or other such system or service may then sign the certificate signing requests (CSRs) for the machines blindly, which provides for scalability but does not provide for adequate verification of trust in many instances.

Approaches in accordance with various embodiments can attempt to provide an adequate trust model for these and other such situations while allowing for scalability. In at least some of these embodiments, a two-part functional process is utilized which includes what are referred to herein as a rationalization procedure and a justification procedure. In the rationalization procedure, a security system that does not yet have access to the appropriate information for making a trust decision can attempt to rationalize the decision based upon information that is currently available. As mentioned, in environments such as auto-scaling or infrastructure-as-code environments, not all information is available in real-time such that event logs and other data sources may not be readily available for evaluation. In one example system, the event logging system can take up to fifteen minutes to populate. If a certificate authority or public key infrastructure system for a security team waits fifteen minutes to sign the certificate for a virtual machine, for example, the security system would negatively impact the business availability by not providing infrastructure resources in a timely fashion. With a lack of important information in a decision making process, some compromises must be made to rationalize a decision based at least in part upon the information that is readily available. This information can include, for example, information as to whether the event is an expected event or an event of an expected type. Another useful piece of information relates to whether the event conforms to an expected outcome, as well as whether the event is a system outlier based upon previously observed events.

Some approaches can additionally, or alternatively, determine whether the requesting machine can provide the certificate authority or security system with a valid nonce, HMAC-based one-time password (HOTP), Time-based one-time password (TOTP), or other such cryptographic material for use in the rationalization process. The various types of data can be aggregated and used to generate a rationalized trust score, for example, that can be evaluated against a determined minimum trust threshold. The score must at least meet the minimum trust threshold (e.g., 80% or 100% of criteria must match expected criteria) in order to rationalize the trust the security system places in the machine. By at least meeting the threshold, the security system can then place trust in the machine by, for example, signing the certificate signing request (CSR).

In public key infrastructure (PKI), a CSR is a message sent from a requestor to a certificate authority in order to attempt to obtain a digital identity certificate. The CSR can be in any appropriate format supported and/or specified by the certificate authority, as may include Signed Public Key or PKCS #10, among others. A CSR generally will include the certificate request information, a signature algorithm identifier, and a digital signature on the certification request information. A CSR in at least some embodiments includes a block of encrypted text for which the certificate will be applied. The text can include information that will be included in the certificate, as may include the qualified name, organization name, geographical information, and a public key to be included in the certificate that is usually generated concurrently with the generation of the CSR. The CSR can be submitted to an identity manager, such as a certificate authority, who can use the CSR to create, for example, an SSL certificate. The certificate can then be signed by the certificate authority. The CSR will only work with the private key that was used to generate the CSR in most instances. The bit length of the private key and CSR can determine its security, such that 2048 bit keys are currently used for SSL and other certificates.

In many instances, particularly when the criteria are set accurately and the data is reliably obtained and stored, the rationalization process will be relatively accurate in determining whether or not to obtain a signature for a certificate signing request. There can be instances, however, where the machine making the request should not have been trusted, and thus the CSR should not have been signed. In such a situation, it can be important to revoke the certificate as quickly as possible, and possibly even terminate the machine or otherwise make the machine unavailable to other components in the network or environment. This "justification" procedure, as referred to herein, utilizes the log data or other sources of truth (e.g., API request records) once they become available. A monitoring and/or verification system, service, component, or process can analyze the newly available information to confirm that all information was indeed valid, and that the rationalization was justified and the respective machine should be trusted.

Figure 2:
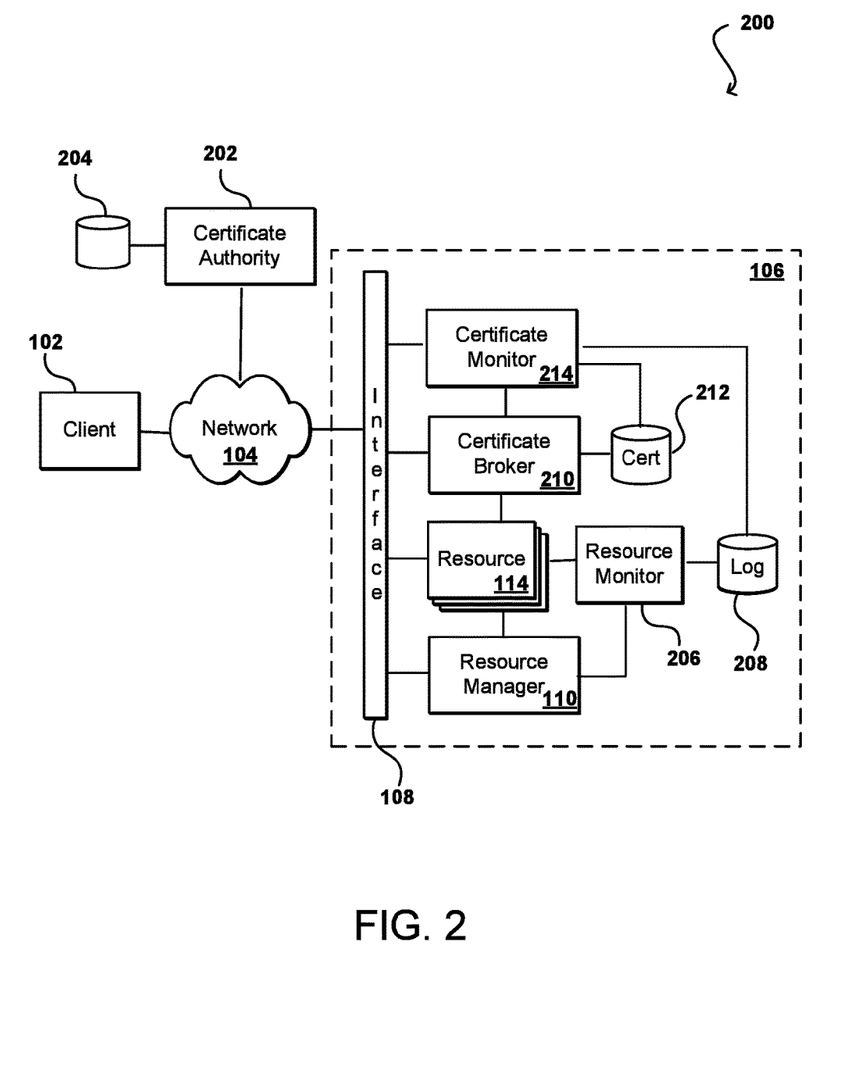
FIG. 2 illustrates an example environment for performing a two stage credential management process that can be utilized in accordance with various embodiments.

FIG. 2 illustrates an example implementation 200 including components that can provide these and other such functions in accordance with various embodiments. As mentioned previously, a client device 102 can be associated with a user having access rights to resources 114 in the shared network environment, or a customer having an account with a resource provider associated with the shared network environment 106, or multi-tenant environment, whereby the customer can have a deployment of resources allocated for that customer account. The requests can be transmitted over at least one network 104 to an interface layer 108 of the shared resource environment 106. The request can be received to an API or other interface of the interface layer 108, and information for the request can be directed to the appropriate resource(s) 114 for processing. As mentioned, a system or service such as a resource manager 110 can be responsible for deploying and managing various aspects of the resources, which can include determining that the access to the resources, as well as the types and configurations of the resources, are permitted under the terms of the customer account.

As mentioned, the resources 114 allocated for a customer account can change over time, such as may be based upon need or usage changes. This can occur in some instances in response to a request received from the client device 102 or from a resource manager 110, among other such options. The requests, API calls, or other instructions to adjust the resource allocation can be detected by a resource monitor 206 or other such system, service, component, or process in the shared resource environment, or otherwise, and information written to a log data store or other such repository where event information is stored and made available to other systems, services, components, or processes in, or external to, the shared resource environment 106. Information about the adjustment and other associated events can also be logged to the log data store 208 as event data in at least some embodiments.

When a resource such as a physical or virtual machine is provisioned and being made available for use, a variety of packages, software, and other components are typically installed in order to enable the machine to communicate as needed, as well as to function for its intended purpose. This purpose can be any appropriate purpose indicated for the customer environment, as may include functioning as a webserver or application server, among other such options. If at least some of the communications are to be secure, a digital secret such as a certificate, key, or password will often be transmitted to the machine during the installation and configuration process. In some cases, the machine will, as part of the configuration and startup process, generate a certificate signing request (CSR) and send that request to an appropriate certificate authority, or other such identity service, in order to obtain a certificate, such as an SSL TLS certificate, that is signed by a certificate authority using public key infrastructure (PKI) processes. That signing process establishes trust in the machine, such that communications with that machine can be trusted to be secure and authorized, etc. In order to ensure the validity of the signatures, there can be a chain of certificate authority or a master certificate authority that signs using digital signatures and validates that a particular certificate for a machine is approved for use. Other entities, systems, services, or processes can then determine that the machine can be trusted as the certificate is signed by a trusted authority and the signature path back to that authority can be verified.

Such an approach to assuring trust can be a highly privileged process. It can be important to ensure that the approach is not simply blindly trusting a million machines, for example, as the trust is indicating to other machines and entities that they can feel safe communicating with this machine because it is trusted. When working with a customer to try to determine when certificates should be signed for machines that are coming online within the resource provider environment, such as may be part of a deployment or auto scaling process, it can be difficult to determine when those certificates should be signed, particularly in a regulated environment. In regulated environments such as PCI, for example, the customer has to be compliant and prove to auditors that the allocation of resources is in line with best practices or other such guidelines. One way to determine when to sign the certificates is to verify the source of the instruction or request to launch the machine or, if part of an auto-scaling group, verify the source of the instruction or request to create the auto-scaling group. As mentioned, however, in at least some environments this information is provided through event logs or other such data sources where the data takes some amount of time to be available, in some cases having a delay on the order of five to fifteen minutes. Since it is impractical to wait this amount of time to make a resource available in many instances, another approach can be taken in order to reduce the amount of time needed to determine that the machine should be trusted.

As mentioned, a first part of one such process is a rationalization procedure. In the example implementation 200 illustrated in FIG. 2, a system or service such as a certificate broker 210 can attempt to rationalize a trust decision as to whether to obtain a signature for a certificate for a machine being configured for use in the shared-resource environment. A resource sending a certificate signing request (CSR) for signature can send that request to the certificate broker 210, which can act as a broker or intermediary between the certificate authority 202 and the resource. It should be noted that in some embodiments a separate certificate broker 210 is not a requirement, as the same techniques can be implemented within the certificate authority 202 itself. Although illustrated to be outside the shared resource environment 106, it should be understood that the certificate authority 202 or other identity provider can be located within the customer environment as well in various embodiments. The certificate broker 210 can receive the request from the resource and analyze various types of information about the request or the machine, where the types of information are readily available without significant delay. As mentioned, one piece of information relates to whether the event is an expected event or an event of an expected type. For example, is the timing and type of machine launch for a given customer within expectations, is the configuration as expected, is the request received at an expected point in the configuration process, is the request formatted as expected with the expected information, etc. In other words, the certificate broker can look at any available information about the machine submitting the request, the request itself, the customer for whom the machine is submitted, and/or the cause of the machine being provisioned in the first place, among other such information, in order to determine whether any aspects of that information is unexpected or peculiar, or outside specified ranges, values, or timings, etc.

In some embodiments a determination as to whether an instance, machine, or other resource was approved for launch can depend at least in part upon the parameters that the instance presents about itself. As an example, this can include the machine image that was used to launch the instance, as well as whether the instance is running a particular operating system (OS) or version of that OS, the type of software distribution, and other such aspects. Further, a determination can be made as to whether the instance was launched into a particular role in the environment or customer deployment. A determination can be made as to the timing of a launch, such as during am expected or valid period of auto-scaling. In some embodiments various programmatic thresholds can be specified as to when signing a certificate for a specific kind of instance would be approved, and then determining whether the values for an instance fall within those thresholds. In some embodiments this information can come from the APIs or other interfaces used to make the calls or requests as well.

In some embodiments, a trust threshold of 100% may be required in order for a certificate to be signed. As mentioned, in some embodiments there may be some variation allowable for at least certain parameters, such that a trust threshold of around 80% might be specified, wherein the certificate will be signed for scores at or above that threshold, unless other forbidden variation is present for the request. There may be various other thresholds or ranges specified as well. For example, a lower trust threshold of around 50% might be set as well, such that for requests that fall between the 50% and 80% trust thresholds the signing of the certificate may still be allowed, but information logged or otherwise tracked without triggering an alarm or taking another such action. If the score for the request falls below the lower trust threshold of 50%, then the request will be denied and/or an alarm can be generated, among other such options.

The parameters in at least some embodiments can include any parameters made available by the API of the platform provider or parameters relating to the deployment environment. Of these, the parameters that may be allowed to vary can include, for example, the zone or group into which a machine is launched, as well as the machine image used to generate the machine instance. In at least some embodiments, a customer might specify a set of permissible machine images and the parameter can specify any of those images but no others. For example, in some embodiments a customer might set a security policy indicating a subset of parameters that must match, as well as the machine image used and/or subnet the machine is launched into, and also a trust threshold covering other parameters that may be allowed to vary, etc. Security policies in some embodiments can be set in a programmatic fashion based upon various applicable rules or criteria.

In some embodiments, the certificate broker 210 can determine the types of information that are readily available for the rationalization. There may be a set of possible types specified, but not all of those types may be available in the current instance for the respective machine. The certificate broker can then look at the various instances of data to determine whether all the values are expected, or an extent to which they are expected or at/near an expected value or range. In some embodiments the values must be 100% as expected in order for the machine to be trusted. In other embodiments, some amount of deviation may be allowed, at least for some types of information. For example, there may be various addresses used under a customer account and requests can be submitted at various times, and some variation in these and other parameters may be allowed. For other parameters any deviation may be sufficient to prevent the machine or request from being trusted. Thus, in some embodiments the various parameters are analyzed to determine their similarity to an expected or target value, with any deviation resulting in a score reflecting that deviation. The scores for all the parameters can then be aggregated into a single score or an overall score can be generated based on these deviations, among other such options. This score can then be compared against a trust threshold to determine whether to trust the machine under the rationalization criteria. As mentioned, this can include a trust threshold of, for example, at least 80% or a similar value. Further, in at least some embodiments all of the required values must meet their expected values in order for the trust to be granted, regardless of the overall score. Various functions and combinations can be used to generate the overall score. Further, modeling and/or machine learning can be used to update the weightings or functions over time in order to improve accuracy of the rationalization decisions.

If the trust is granted under the rationalization procedure, the certificate broker 210 can cause the CSR to be signed, such as by forwarding the request to the certificate authority 202 that can compare against information stored in a local repository 204, and can store information for the request and trust decision in a certificate data store 212 or other such repository. The certificate broker 210 can provide the signed certificate to the resource 114 once received, and in at least some embodiments can also store a copy of the signed certificate or other secret to the certificate data store as appropriate. If the rationalization decision is to not grant trust, then a couple different actions can be taken. In one embodiment, the trust is not granted and the machine is made unavailable, with the requestor being notified that the machine was placed into an unavailable state. In another embodiment, the trust decision might be put on hold until the log information is available, in order to make a more informed decision before denying the provisioning of the machine. In still other embodiments, the machine may be provisioned with limited trust, such that a signed certificate might be provided but the functionality of the resource limited until a more informed decision can be made. In some embodiments the action taken can depend at least in part upon the result of the rationalization decision. Certain unexpected values can cause the machine to be instantly deleted or otherwise removed from the environment. Other values might fall below the trust threshold but be of a value that enables the machine to temporarily be granted limited trust, or require human interaction to approve or deny, among other such options.

In some embodiments, information can be passed during the initialization or bootstrapping process of the machine that can include cryptographic material, such as a one-time password that uses hash-based message authentication code (HMAC), HMAC-based one-time password, or time-based one-time passwords, among other such options. In some embodiments, the customer's private key can be used to digitally sign a time-based one-time password (TOTP) or HMAC-based one-time password (HOTP). The cryptographic material can be designated for use, and the material can be verified by the certificate authority 202, or certificate broker 210, before the certificate for the machine is digitally signed.

Once the machine certificate is signed by the certificate authority and fully configured and made available, other components in the shared resource environment 106 and/or devices outside the environment, such as the client device 102, can communicate securely with the machine as a trusted entity. It is possible, however, that because the rationalization process had only limited information such as the available logs and environment metadata, for example, that the decision to trust the machine was inaccurate. If the decision was inaccurate, and the machine should not be trusted, then the machine should be deactivated or the certificate quickly revoked, among other potential actions.

Approaches in accordance with various embodiments can utilize a second step, herein referred to as the justification procedure. The justification procedure can begin once the verification information becomes available. In the example implementation 200 of FIG. 2, the certificate monitor 214 can monitor the event log 208 to determine when the relevant information is available. In other embodiments the resource monitor 206 can notify the certificate monitor 214, among other such options. The certificate monitor 214 can then obtain and analyze the information to determine whether the source of the machine or instance launch was authorized to request or instruct the launch. As mentioned, this can include information about the identity of the source, what was requested, when it was requested, the mechanism by which the request was transmitted, where the request was received from, etc. Various other determinations can be made as well, such as whether the request came from a testing environment and should not have been signed by a certificate authority for the production environment. If the trust should not have been granted, then the certificate monitor 214 can contact the certificate broker 210 and/or certificate authority 202 to cause the certificate to be revoked. The certificate monitor 214 in some embodiments can also contact the resource manager 110, such as by calling the appropriate API, in order to cause the machine to be removed from availability or otherwise deleted or taken offline, for example, or can at least make such a recommendation or provide information about the revocation of trust for the respective machine.

As mentioned, in some embodiments the one-time password could be a time-based one-time password (TOTP) or an HMAC-based one-time password (HOTP). An advantage to a time-based password is that it expires after a short period of time, such as 30 seconds, after which a compromised password cannot be used. Such passwords do not allow for significant latency or processing time, such that in other embodiments HOTP passwords may be more appropriate that last for longer lengths of time, but require more processing resources and management to provide and manage the HMAC for each password. An example of a TOTP that can be used is a multi-factor authentication (MFA) token. A server on the other end of a request can calculate the same token using the appropriate algorithm to verify whether or not the requesting entity is authorized to authenticate at that time. Outside of the time window for the password, the requesting entity would not be authorized to authenticate. Some approaches may allow for some variance near the edges of the time window in order to account for different machines drifting by different amount over time and not synchronizing to a common clock, etc.

A user launching a machine instance in such an environment can inject a one-time password with a designated block or period of time. In at least some embodiments the user can provide a certificate authority with the one-time password indicating that the instance is authorized but ensuring that the one-time password cannot be reused if it is theoretically sniffed on the wire or otherwise obtained by an attacker or other unauthorized third party. Further, the user can enhance security by indicating that the one-time password can also only be used within a specified block of time, such as within a thirty to ninety second window of time. The request to authorize the signing of the certificate can then pass the trust from the certificate authority to the person deploying the instance. The use of a one-time password in some embodiments can be provided through the injection of the appropriate code in an instance template or other such object. If the creation of a new machine instance is performed as a result of auto-scaling of a group of servers, for example, the sessions may be longer lived so it might be necessary to designate a significantly longer period of time, such as three days or thirty days, etc.

In some embodiments the results of the rationalization process can be analyzed over time in order to attempt to determine trends or patterns, which can help in taking further actions to secure the deployment. For example, a number or frequency of certain events failing or parameters not matching may trigger a lookup or analysis to determine whether those failures are associated with a particular entity, location, type of request, etc. If so, a restricted policy permission may be applied to prevent similar requests from being processed to launch new or additional instances. This may be beneficial because an attacker might try various types of requests to attempt to find an approach that works, and these different types of requests might not otherwise be correlated for purposes of identifying a potential attack.

As mentioned, in some instances an attacker might be able to get a certificate signed as a result of the rationalization process, but the improper determination discovered as a result of the justification process. If the signature should not have been provided, then the credential can be revoked. Such a revocation can take different forms in different embodiments. For example, a certificate revocation list (CRL) within the public key infrastructure for an environment can be updated such that other machines can perform a lookup on the CRL to determine whether a certificate for a request has been revoked. Such an approach may not be optimal for large deployments, however, where the CRL could potentially contain millions of entries which would take significant time and resources to check continually. Thus, it can be even more important for large deployments that the rationalization process is implemented effectively. Once revoked, no machines will trust the certificate going forward, which can prevent the attacker from continuing to use that certificate. In at least some embodiments the machine or instance launched by the attacker, or other unauthorized party, would also be terminated. Any data written or modified by that machine, or other actions taken, may also be deleted or undone if possible, for at least some situations. Simply deleting the machine and undoing operations performed by that machine would not in and of itself be sufficient, as the signed certificate could be used to launch other instances if not revoked, etc. In some embodiments, the revocation lookup may use Online Certificate Status Protocol (OCSP) instead of certificate revocation lists.

In some embodiments the justification process can be an ongoing process and/or there can be an additional process used after the justification process is completed. In some cases, the data received for the justification process might indicate that the decision to sign a certificate was valid. It might be the case, however, that subsequently it is determined that the certificate should not be signed or should no longer be valid. For example, a certificate might be leaked or it might be determined that an account was compromised, such that the credential should be revoked. If it is determined that certain patterns of behavior or sources of request meet certain validity criteria but ultimately do not comply with the rules of the environment, then those patterns and behaviors can be used to determine which certificates to revoke, and can be incorporated in the rationalization decision going forward. Many other such observations and revocations can be implemented as well within the scope of the various embodiments.

Figure 3:
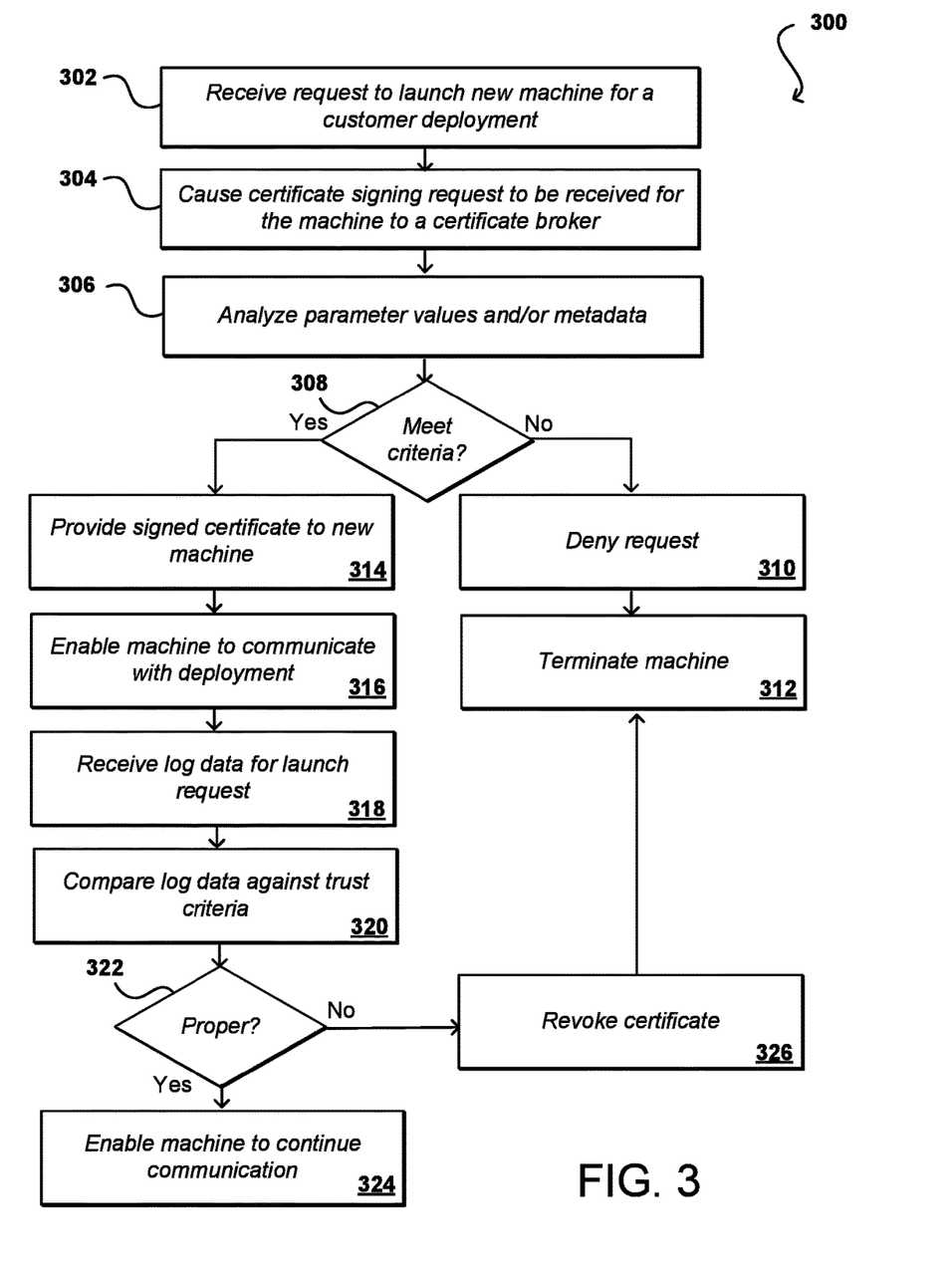
FIG. 3 illustrates an example process for determining whether to provide a signed certificate that can be utilized in accordance with various embodiments.

FIG. 3 illustrates an example process 300 for determining whether to provide security credentials, such as a signed certificate, for a machine to be launched for a customer deployment that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request to launch a new machine (i.e., a physical machine or a virtual machine instance operating on a physical resource) is received 302 on behalf of a customer deployment. As mentioned, the request can be generated automatically as part of an auto-scaling procedure or manually as part of a customer system, among other such options. The request can include any appropriate information needed to authenticate and/or authorize the request in order to have the machine launched with the appropriate configuration and permissions. In order to communicate with other machines in the customer deployment, and potentially elsewhere, the machine in this example will need to obtain at least one specific security credential, in this case a signed digital security certificate. The new instance can be initiated and as part of the startup and configuration process the machine can generate a request for receiving a valid certificate signed by the certificate authority. In this example, this request is in the form of a certificate signing request (CSR).

The CSR can be caused 304 to be received by a certificate broker, which logically sits between the new machine being initiated and a certificate authority or other identity service. The CSR can include various types of information as discussed elsewhere herein, which can be different from the information used to launch the instance as the request in this example will come from the machine itself and not from an external source. The parameter values for the request and/or related resource or environment metadata can be analyzed 306, such as by determining the appropriate parameters and comparing the values against one or more trust criteria. The metadata can provide information such as the machine image that was used, the applicable security group, an applied role, etc. As mentioned, there may be values for certain parameters that must be as expected, and values for other parameters that may be allowed to vary by at least some extent. If the parameter values are determined 308 to not at least meet the appropriate trust criteria, then the CSR can be denied 310. In at least some embodiments, the new machine being configured into the customer deployment can also be terminated 312.

If the parameter values for the request at least meet the trust criteria, then the signed certificate can be provided 314 to the new machine. This can involve, for example, the certificate broker approving the CSR, then passing the CSR along to a certificate authority or otherwise obtaining the signed certificate from a certificate authority, which the broker can then provide to the machine or have sent directly to the machine, among other such options. Once the machine is configured and has possession of the signed certificate, the machine can be enabled 316 to communicate with other machines within, and associated with, the customer deployment. After a period of time, the log data associated with the launch request can become available and can be received 318 by the system. This log data can be compared 320 against specific trust criteria that would have been used to initially determine whether or not to process the CSR if the log data had been available. If it is determined 322 that the decision to process the CSR and provide the signed certificate was proper, then the machine can be enabled 324 to continue communication with the deployment. Information for the decision can also be logged for future decisions. If it is determined that the digital certificate should not have been provided, then the certificate can be revoked 326 such that further communication attempts by the machine within the customer deployment will be denied. In at least some embodiments, the respective machine can also be terminated 312, and any actions taken by that machine undone to the extent possible and/or practical.

Figure 4:
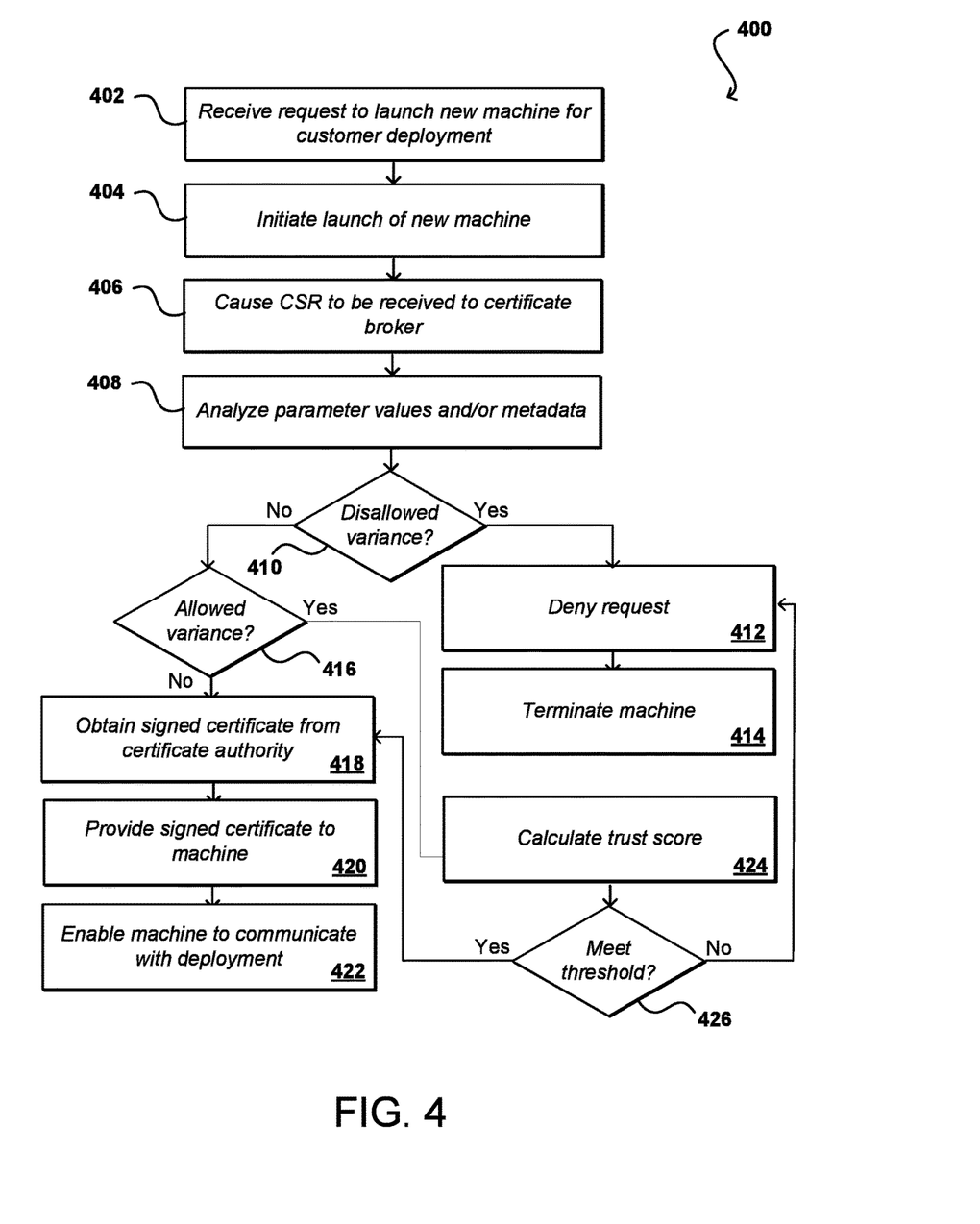
FIG. 4 illustrates an example rationalization process that can be utilized in accordance with various embodiments.

FIG. 4 illustrates a more detailed example of a rationalization procedure 400 of the decision process discussed with respect to FIG. 3. In this example, a launch request is again received 402 for a new machine to be utilized for a customer deployment. In response to the request, the launch of a new machine can be initiated 404 for the customer deployment as discussed previously. As mentioned, during the startup process a CSR can be generated by the new machine, and that CSR can be caused 406 to be received to a certificate broker sitting logically between the machine and the appropriate certificate authority. The parameter values for the CSR can then be analyzed 408 to determine whether or not to provide the signed certificate for the machine.

In this example, the criteria for granting a CSR can specify whether or not any variance is allowed in the parameter values, as some organizations' security policies may require 100% compliance with expected values for such a request. Even if some variance is allowed, there can be certain types of variance which are not permitted as discussed herein. In this example, a determination can be made 410 as to whether the request includes any disallowed variance, which can include any variance where no variance is permitted, or variance of a specific parameter which is not permitted, among other such options. If at least some amount of disallowed variance is associated with the CSR, then the request can be denied 412 and in at least some situations the corresponding machine itself will be terminated 414. If there is no disallowed variance, another determination can be made 416 in this example as to whether there is any allowed variance, although these could be part of the same decisions or decisions made concurrently in at least some embodiments. If there is some variance allowed, the parameter values (and any other appropriate information) can be analyzed to calculate 424 a trust score, which can be a weighted combination of value expectations in some embodiments as discussed elsewhere herein. The trust score can be compared against at least one trust threshold, and a determination made 426 as to whether the trust score at least meets a determined trust threshold. As mentioned, in some embodiments there can be multiple thresholds and the action taken can depend upon which threshold(s) the score meets or exceeds. If the score does not at least meet a determined trust threshold, then the request can be denied and the machine terminated. If, however, the trust score meets or exceeds the relevant trust threshold, then a CSR can be submitted to a certificate authority to obtain a signed digital certificate, or other certificate can be otherwise obtained 418 by the certificate broker. The signed certificate can then be provided 420 to the new machine. Once the machine is configured and has possession of the signed certificate, the machine can be enabled 422 to communicate with other machines within, and associated with, the customer deployment. These can include, for example, client devices external to the shared resource environment among other such systems or devices.

Figure 5:
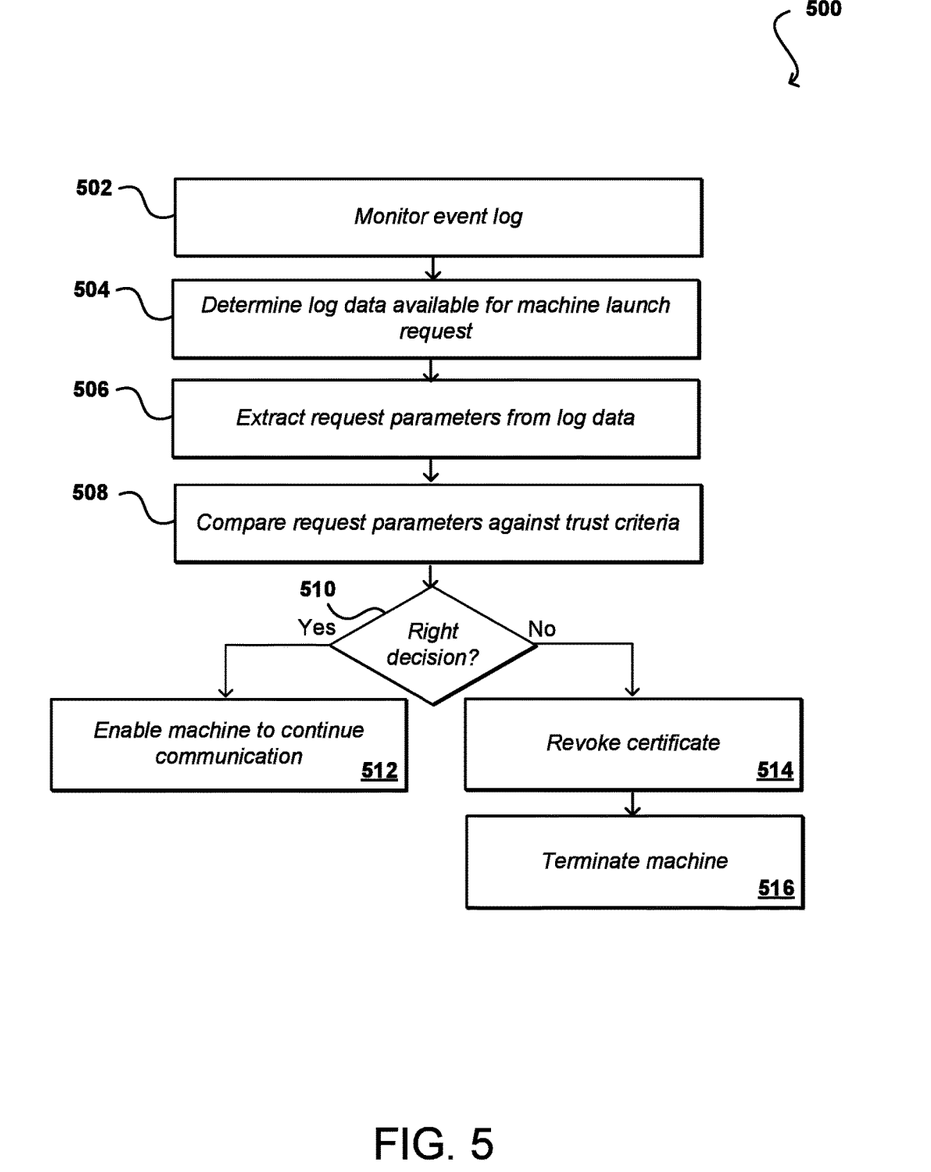
FIG. 5 illustrates an example justification process that can be utilized in accordance with various embodiments.

FIG. 5 illustrates a more detailed example of a justification procedure 500 that can be used with the rationalization procedure discussed with respect to FIG. 4. In this example, an event log or other data repository can be monitored 502 that will periodically receive and store data for events occurring in the shared resource environment, such as requests received to initiate machines for the customer deployment. In other embodiments notifications can be sent when new data is received, among other such options. It will be determined 504 that the corresponding log data for the launch request is available in the event log. The log data can be identified and the appropriate request parameters, and other relevant data, extracted 506 from the log data. These can include any appropriate parameters that could have been used to make a certificate authorization or other such decision as discussed elsewhere herein. The request parameters can then be compared 508 against one or more trust criteria to determine whether the decision to grant the signed digital certificate for the machine was the proper decision based upon the trust criteria. As mentioned, the trust criteria can include a specific set of parameters to be received, or a set of expected parameter values and a trust score threshold, among other such options. If the trust criteria are sufficiently satisfied such that a determination can be made 510 that granting the signed certificate was the correct decision, then the machine can be enabled 512 to continue to communicate within the customer deployment. If it is determined that the rationalization decision was incorrect, then the certificate can be revoked 514 and the machine terminated 516, among other such options.

As mentioned, results from the justification procedure can be used to update the criteria, rules, or models used for the rationalization procedure. This can include, for example, updating expected good or bad behavior based upon actual results, as may be fed to a trained model for updating using one or more machine learning algorithms or other such procedures. Further, as mentioned the monitoring can continue in at least some embodiments such that if additional information becomes available that indicates that the certificate should not have been signed, or should no longer be valid, then the certificate can be revoked and machine terminated, and the data used to make the rationalization decisions updated accordingly.

Figure 6:
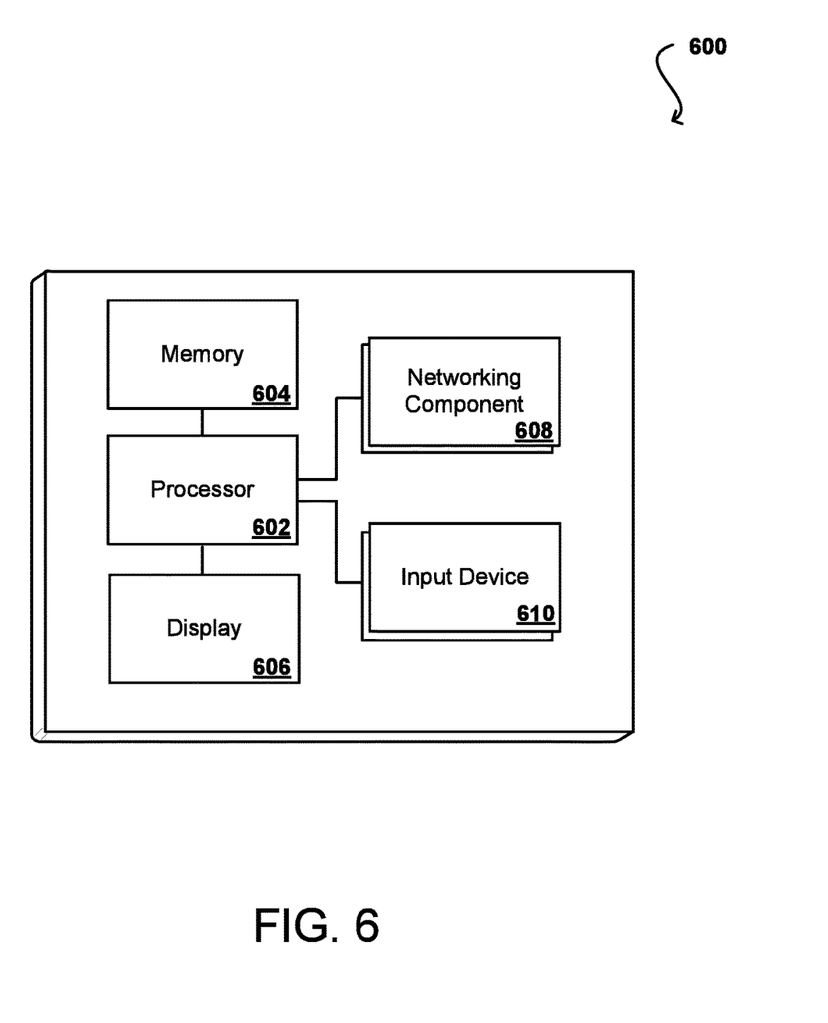
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, on behalf of a customer, a request for a virtual machine to be hosted by a resource in a shared resource environment, the customer having an account with a resource provider associated with the shared resource environment;
   initiating a launch process for the virtual machine, the launch process causing a certificate signing request (CSR) to be transmitted by the virtual machine;
   receiving the CSR to a certificate broker of the shared resource environment, the certificate broker configured to receive the CSR and contact a certificate authority on behalf of the virtual machine;
   determining, based at least in part upon at least one of information associated with the CSR or the metadata associated with the resource, to cause a signed digital certificate to be obtained from the certificate authority for the virtual machine;
   providing the signed digital certificate to the resource to enable the virtual machine to communicate with other resources allocated to the customer in the shared resource environment;
   receiving, subsequent to enabling the communication for the virtual machine with the other resources, event log data relating to the request for the virtual machine;
   analyzing the event log data to determine whether the virtual machine satisfies one or more trust criteria for obtaining the signed digital certificate; and
   revoking the signed digital certificate if the virtual machine is determined, based at least in part upon the event log data, to not satisfy the one or more trust criteria.

2. The computer-implemented method of claim 1, further comprising:
   terminating the virtual machine in response to the virtual machine being determined, based at least in part upon the event log data, to not satisfy the one or more trust criteria.

3. The computer-implemented method of claim 1, further comprising:
   enabling the virtual machine to continue communicating with other resources allocated to the customer in the shared resource environment in response to determining that the virtual machine satisfies the one or more trust criteria.

4. The computer-implemented method of claim 1, further comprising:
   receiving the request for the virtual machine from one of a client device associated with the customer or an auto-scaling manager associated with the shared resource environment.

5. A computer-implemented method, comprising:
   receiving, to a resource associated with a user, a request for a security credential;
   causing a virtual machine of the resource to transmit a second request associated with the security credential as part of a launch process;
   causing a certificate broker to process the second request on behalf of the virtual machine;
   receiving the security credential from the certificate broker;
   determining, based at least in part upon at least one of metadata for the resource or information associated with the second request, to provide the security credential to the resource;
   obtaining, subsequent to providing the security credential, event information relating to launching of the resource;
   enabling the virtual machine to communicate with other resources using the security credential;
   determining, based at least in part upon the event information and subsequent to enabling the communication for the virtual machine with the other resources, whether the resource should have been provided with the security credential; and
   revoking the security credential if the resource should not have been provided with the security credential based at least in part upon the event information.

6. The computer-implemented method of claim 5, further comprising:
   analyzing the information associated with the second request, wherein the second request is a certificate signing request (CSR) and the information indicates whether the resource submitting the CSR is one of an expected type of event, an expected outcome of an event, or an outlier event.

7. The computer-implemented method of claim 6, further comprising:
obtaining the security credential from a certificate authority, the security credential being a digital certificate signed by the certificate authority.

8. The computer-implemented method of claim 5, further comprising:
receiving an initial request to launch the resource on behalf of a customer of a resource provider providing a shared resource environment for hosting the resource, the initial request being received from one of a client device associated with the customer or an auto-scaling manager associated with the shared resource environment, wherein the event information includes information associated with the initial request.

9. The computer-implemented method of claim 8, further comprising:
enabling the resource to continue to use the security credential in response to determining that the resource should have been provided with the security credential based at least in part upon the event information, the security credential enabling the resource to communicate with other resources allocated to the customer in the shared resource environment.

10. The computer-implemented method of claim 5, further comprising:
determining to provide the security credential to the resource further based at least in part upon the resource providing at least one of a valid nonce, an HMAC-based one-time password (HOTP), a time-based one-time password (TOTP) received during a corresponding time window, or related cryptographic material.

11. The computer-implemented method of claim 5, further comprising:
determining to not provide the security credential to the resource in response to any information for the second request differing from a required value.

12. The computer-implemented method of claim 5, further comprising:
calculating a trust score for the resource based at least in part upon values from at least one of the metadata or the information for the second request;
comparing the trust score against a trust threshold; and
determining to provide the security credential to the resource in response to the trust score at least meeting the trust threshold.

13. The computer-implemented method of claim 5, wherein the event information includes at least one of event log data, an application programming interface (API) call record, resource metadata, service provider metadata, or a source of truth record for the resource.

14. The computer-implemented method of claim 5, further comprising:
monitoring an event log to determine availability of the event information.

15. The computer-implemented method of claim 5, further comprising:
revoking the security credential, subsequent to determining that the resource should have been provided with the security credential, in response to additional data being received indicating that the resource should no longer have access to the security credential.

16. A system, comprising:
at least one processor; and
memory including instructions that, when executed by the at least one processor, cause the system to:

receive, to a resource instance associated with a user, a request for a security credential;
causing a virtual machine of the resource instance to transmit a second request associated with the security credential as part of a launch process;
causing a certificate broker to process the second request on behalf of the virtual machine;
receiving the security credential from the certificate broker;
determine, based at least in part upon at least one of metadata for the resource instance or information associated with the second, to provide the security credential to the resource instance;
obtain, subsequent to providing the security credential, event information relating to launching of the resource instance;
enabling the virtual machine to communicate with other resource instances using the security credential;
determine, based at least in part upon the event information and subsequent to enabling the communication for the virtual machine with the other resource instances, whether the resource instance should have been provided with the security credential; and
revoke the security credential if the resource instance should not have been provided with the security credential based at least in part upon the event information.

17. The system of claim 16, wherein the instructions when executed further cause the system to:
analyze the information associated with the second request, wherein the second request is a certificate signing request (CSR) and the information indicates whether the resource instance submitting the CSR is one of an expected type of event, an expected outcome of an event, or an outlier event; and
obtain the security credential from a certificate authority, the security credential being a digital certificate signed by the certificate authority.

18. The system of claim 16, wherein the instructions when executed further cause the system to:
receive an initial request to launch the resource instance on behalf of a customer of a resource provider providing a shared resource environment for hosting the resource instance, the initial request being received from one of a client device associated with the customer or an auto-scaling manager associated with the shared resource environment, wherein the event information includes information associated with the initial request.

19. The system of claim 16, wherein the instructions when executed further cause the system to:
enable the resource instance to continue to use the security credential in response to determining that the resource instance should have been provided with the security credential based at least in part upon the event information, the security credential enabling the resource instance to communicate with other resource instances allocated to the customer in the shared resource environment.

20. The system of claim 16, wherein the instructions when executed further cause the system to:
calculate a trust score for the resource instance based at least in part upon values from at least one of the metadata or the information for the second request;
compare the trust score against a trust threshold; and determine to provide the security credential to the resource instance in response to the trust score at least meeting the trust threshold.

\* \* \* \* \*